United States Patent Office 2,904,583
Patented Sept. 15, 1959

---

2,904,583

CARBOXYLATED THIOSULFATES

Van R. Gaertner, Dayton, Ohio, assignor to Monsanto Chemical Company, St. Louis, Mo., a corporation of Delaware No Drawing. Application December 21, 1956
Serial No. 629,802

10 Claims. (Cl. 260—481)

The present invention relates to organic sulfur compounds having surface-active properties.

According to the invention there are provided carboxylated thiosulfates of the formula $$RO(CH_2CH_2O)_nOC(CH_2)_mSSO_3M$$

in which R is the branched chain tridecyl radical derived from a tridecyl alcohol obtained according to the "Oxo" process by the high temperature, high pressure reaction of carbon monoxide and hydrogen with an olefin polymer selected from the class consisting of propylene tetramer and butylene trimer, $n$ is an integer of from 0 to 15, $m$ is an integer of from 1 to 2 and M is selected from the class consisting of alkali metal and ammonium. For convenience said tridecyl alcohol will be referred to hereinafter as "Oxo" process tridecyl alcohol, and the tridecyl radical derived therefrom will be hereinafter referred to as a branched chain tridecyl radical.

The present carboxylated thiosulfates are readily prepared according to the invention by the reaction of (1) the ester of an acid selected from the class consisting of chloroacetic acid and β-chloropropionic acid and a hydroxy compound selected from the class consisting of said "Oxo" process tridecyl alcohol and the hydroxylated ethers thereof obtained by the addition reaction of said alcohol with from 1 to 15 moles of ethylene oxide and (2) an inorganic thiosulfate selected from the class consisting of alkali metal and ammonium thiosulfates.

Esters employed according to the invention in the reaction with the inorganic thiosulfates are obtained by the reaction of chloroacetic acid or β-chloropropionic acid or the acyl halides or anhydrides of said acids with the "Oxo" process tridecyl alcohol or its ethylene oxide addition product. Reaction of the esters with the inorganic thiosulfates takes place according to the scheme:

$$RO(CH_2CH_2O)_nOC(CH_2)_mCl + M—S—SO_2OM$$
$$\rightarrow RO(CH_2CH_2O)_nOC(CH_2)_mSSO_2OM + MCl$$

in which R, $n$, $m$ and M are as defined above.

One class of esters which I employ in the reaction with the alkali metal or ammonium thiosulfates for the preparation of the present carboxylated thiosulfates has the formula $$ROOC.(CH_2)_mCl$$

in which R is the tridecyl radical derived from "Oxo" process tridecyl alcohol and $m$ is 1 or 2. This includes branched chain tridecyl chloroacetate and tridecyl β-chloropropionate. The carboxylated thiosulfates obtained therefrom have the formula $$ROOC(CH_2)_mSSO_3M$$

in which R, $m$ and M are as herein defined.

Another class of esters which I employ in the reaction with the alkali metal or ammonium thiosulfate for the preparation of the present carboxylated thiosulfates has the formula $$RO(CH_2CH_2)_xOC(CH_2)_mCl$$

in which R is the tridecyl radical derived from "Oxo" process tridecyl alcohol, $x$ is an integer of from 1 to 15 and $m$ is 1 or 2. This includes branched chain 2-tridecyloxyethyl chloroacetate and 2-tridecyloxyethyl 2-chloropropionate which are obtainable from chloroacetic acid or β-chloropropionic acid and the branched chain 2-tridecyloxyethanol prepared by the addition reaction of 1 mole of "Oxo" process tridecyl alcohol and 1 mole of ethylene oxide. It also includes the branched chain tridecyloxypolyethyleneoxyethyl chloroacetates and β-chloropropionates obtainable by the reaction of chloroacetic acid or β-chloropropionic acid with 2-(tridecyloxypolyethyleneoxy)ethanols prepared by the addition reaction of 1 mole of "Oxo" process tridecyl alcohol with from 2 to 15 moles of ethylene oxide. The carboxylated thiosulfates obtained therefrom have the formula $$RO(CH_2CH_2O)_xOC(CH_2)_mSSO_3M$$

wherein R, $x$, $m$ and M are as herein defined.

The inorganic thiosulfates which I employ in the reaction with the above chloroacetates or chloropropionates to prepare the present carboxylated thiosulfates are sodium thiosulfate, potassium thiosulfate, lithium thiosulfate and ammonium thiosulfate.

Reaction of the presently useful chloroacetates or β-chloropropionates with the inorganic thiosulfates takes place readily by contacting a mixture of the two reactants at ordinary or increased temperatures and preferably at a temperature of from, say, 50° C. to 100° C. in the presence of an inert diluent or solvent. Refluxing temperatures are preferred. A condensation catalyst, e.g., sodium or potassium iodide may or may not be employed. For smooth reaction a liquid solvent is generally recommended. Conveniently, this may be a mixture of solvents for the inorganic and organic constituents of the reaction mixture, e.g., a mixture of water and an organic liquid such as ethanol, isopropanol, benzene, acetone, ethyl ether, etc. The by-product alkali metal or ammonium chloride is readily removed from the reaction mixture either by decantation and/or alternate concentration, dissolution and precipitation. Alternative procedure involves extraction of the carboxylated thiosulfate with an organic solvent such as isopropanol, acetone, chloroform or tetrahydrofuran, stripping off the solvent from the extract, and final oven- or spray-drying.

The present carboxylated thiosulfates are well defined, stable compounds which range from liquid to waxy or crystalline solids. While they may be advantageously employed for a variety of commercial and agricultural purposes, they are particularly valuable as wetting-out, cleansing and lathering agents. Aqueous solutions of very small amounts of the present carboxylated thiosulfates foam strongly in both hard and soft water and the lather thus produced has very good stability. They are thus very useful as dish-washing agents wherein foam-stability is of major concern. Surprisingly, there is a significant difference in the wetting-out and detersive properties, depending upon whether or not they were derived from the ethylene oxide addition products. The present carbotridecyloxymethyl and carbotridecyloxyethyl thiosulfates are characterized by extremely good wetting-out ability, but they possess only mediocre detersive effect. On the other hand, those of the products which possess the ethyleneoxy-radicals are very good detersive agents, and the detersive efficiency thereof, particularly in hard water, appears to increase with the increasing number of said radicals.

The invention is further illustrated, but not limited, by the following examples:

Example 1

A mixture consisting of 200 g. (1 mole) of "Oxo" process tridecanol, 104 g. (1.1 mole) of chloroacetic acid, 200 ml. of benzene and 2 g. of toluenesulfonic acid was refluxed in a flask which was equipped with a fractionating column and a phase-separating head. At the end of the first hour of refluxing, 19 ml. of water had separated out. Refluxing was continued for an additional hour, and the reaction mixture was allowed to cool. After washing the cooled reaction mixture, twice with water and twice with a 5% aqueous sodium bicarbonate solution, and drying first over a saturated sodium chloride solution and then over sodium sulfate, the reaction mixture was distilled in a zigzag column to give 210 g. of (I), the substantially pure tridecyl chloroacetate, B.P. 135–139° C./1.3–1.2 mm., $n_D^{25}$ 1.4504, and analyzing as follows:

|  | Found | Calc. for $C_{15}H_{29}ClO_2$ |
| --- | --- | --- |
| Percent C | 65.87 | 65.0 |
| Percent H | 10.76 | 10.55 |

There was also obtained 32.5 g. of (II), a crude tridecyl chloroacetate, B.P. 139–141° C./1.1 mm., $n_D^{25}$ 1.4513.

Sodium carbotridecyloxymethyl thiosulfate was prepared as follows from combined products (I) and (II): A mixture consisting of 83 g. (0.3 mole) of said combined products, 82 g. (0.33 mole) of sodium thiosulfate, 200 g. each of water and ethanol, and 1.0 g. of sodium iodide was heated at reflux (pot temp., 80° C.) for one hour. It was then allowed to attain room temperature over night. From the cooled reaction mixture the solvents were removed under vacuum at <40° C. and the residue was dried by repeated distillation with isopropanol. After filtering off the inorganic salts, the residual isopropanol solution was aspirated to dryness to give 124.5 g. of the viscous, translucent sodium carbotridecyloxymethyl thiosulfate. A portion thereof which had been further dried at 56° C. for 24 hours analyzed as follows:

|  | Found | Calcd. for $C_{15}H_{29}NaO_5S_2$ |
| --- | --- | --- |
| Percent C | 47.18 | 47.8 |
| Percent H | 8.04 | 7.77 |
| Percent S | 16.20 | 17.03 |

Example 2

This example describes the preparation of sodium 2-carbotridecyloxyethyl thiosulfate from a tridecyl β-chloropropionate obtained from "Oxo" process tridecyl alcohol.

A mixture consisting of 87.3 g. (0.33 mole) of said chloropropionate, 82 g. (0.33 mole) of sodium thiosulfate pentahydrate, 150 g. of water and 300 g. of ethanol was refluxed, with stirring, for 2 hours, at the end of which time 1.0 g. of sodium iodide was added. Refluxing was then continued for an additional 23 hours. The upper layer which formed upon standing was removed, concentrated under vacuum and dried by distillation with isopropanol. The dried product thus obtained comprised 98.2 g. of the syrup-like sodium 2-carbotridecyloxyethyl thiosulfate, soluble in acetone, ether and hexane. In water it yields slightly turbid, strongly foaming solutions.

Example 3

In another run, 83.7 g. (0.3 mole) of the tridecyl β-chloropropionate used in Example 2 was refluxed with 112 g. (0.45 mole) of sodium thiosulfate, 200 ml. of water and 200 ml. of ethanol for 11 hours, an additional 37 g. portion of sodium thiosulfate pentahydrate was added, and refluxing was continued for an additional ten hours. The resulting reaction mixture was allowed to cool, and the upper alcoholic layer which formed upon standing was removed, diluted with water and filtered twice, using a filter aid. The filtrate was then dried by distillation with isopropanol, and subsequent pistol-drying (56° C.) of the residue. There was thus obtained the substantially pure sodium 2-carbotridecyloxyethyl thiosulfate analyzing as follows:

|  | Found | Calcd. for $C_{15}H_{31}NaO_5S_2$ |
| --- | --- | --- |
| Percent C | 48.45 | 49.2 |
| Percent H | 8.56 | 8.00 |

Example 4

This example describes preparation of a tridecyl ether of a pentaethylene glycol ester of monosodium thiosulfate.

Pentaethylene glycol ether of "Oxo" process tridecyl alcohol, which ether had a molecular weight of 420, was prepared by the reaction of said tridecyl alcohol with 5 moles of ethylene oxide. A mixture of 126 g. (0.3 mole) of the ether thus obtained, i.e., $$RO(CH_2CH_2O)_4CH_2CH_2OH$$

in which R denotes the tridecyl radical derived from the "Oxo" alcohol was then refluxed for 4 hours with 31.2 g. (0.33 mole) of chloroacetic acid in 200 ml. of benzene in the presence of catalytic quantities of toluenesulfonic acid and sulfuric acid, the resulting reaction mixture was neutralized by treatment with sodium bicarbonate, potassium carbonate and alumina, the solids removed from the neutralized mixture, and the benzene removed from the filtrate to give as residue 144.5 g. of the yellow, liquid chloroacetate of the pentaethylene glycol ether of said tridecyl alcohol, i.e., $RO(CH_2CH_2O)_5OCCH_2Cl$ in which R is the tridecyl radical derived from said alcohol.

The above chloroacetate was converted into a thiosulfate as follows: A mixture consisting of 99.3 g. (0.2 mole) of the chloroacetate, 73.2 g. (0.295 mole) of sodium thiosulfate, 1.0 g. of sodium iodide, 200 ml. of water and 200 ml. of ethanol was gradually heated, with stirring, to a temperature of 75° C. and maintained at that temperature for about 40 minutes. The resulting reaction mixture was allowed to stratify, and the upper layer was removed and dried by distillation with isopropanol. After filtering twice to remove inorganic salt the filtrate was evaporated <70° C. to give as residue 119.8 g. (100% of theory) of the substantially pure thiosulfate of the formula $$RO(CH_2CH_2O)_5OOCCH_2SSO_3Na$$

in which R is the tridecyl radical derived from "Oxo" process tridecyl alcohol.

Example 5

This example is like Example 4 except that instead of employing the pentaethylene glycol ether of "Oxo" process tridecyl alcohol there was employed a polyoxyalkylene glycol ether prepared by the addition of one mole of said tridecyl alcohol with an average of 7.2 moles of ethylene oxide, i.e., a mixture of compounds of the formula $$R(OCH_2CH_2)_nOH$$

in which $n$ denotes an average value of 7.2. The chloroacetate thereof, i.e., $RO(CH_2CH_2A)_{7.2}OCCH_2Cl$, wherein R denotes the "Oxo" tridecyl radical was prepared substantially as described in Example 4. Reaction of said chloroacetate with sodium thiosulfate was effected by refluxing, for 1.5 hours, a mixture consisting of 184.5 g. (0.3066 mole) of said chloroacetate, 91.4 g. of sodium thiosulfate monohydrate, 300 g. of ethanol and 100 g. of water. At the end of that time the ethanol-water mixture was stripped off at reduced pressure while replacing it with isopropanol. The resulting isopropanol solution was then distilled in order to remove the isopropanol. At an intermediate point in this distillation the reaction mixture was filtered in order to remove the sodium chloride which had crystallized out. After substantially all of the isopropanol had been stripped off, the product was dried at a pot temperature of 45–50° C./20 mm. to give 214.5 g. of the substantially pure, liquid thiosulfate of the formula $RO(CH_2CH_2O)_{7.2}OCCH_2SSO_3Na$ in which R is the tridecyl radical derived from "Oxo" process tridecyl alcohol.

*Example 6*

This example is like Examples 4 and 5 except that the hydroxy polyalkyleneoxyalkylene ether used was one obtained by the addition reaction of one mole of "Oxo" process tridecyl alcohol with an average of 12.2 moles of ethylene oxide. The chloroacetate of the said hydroxy ether i.e., $RO(CH_2CH_2O)_{12.2}OCCH_2Cl$, wherein R denotes the "Oxo" process alcohol was prepared substantially as described in Example 4. Reaction of the chloroacetate with sodium thiosulfate was effected by refluxing for 1 hour and 40 minutes a mixture consisting of 202.8 g. (0.25 mole) of said chloroacetate, 300 g. of ethanol, 100 g. of water and 74.5 g. of sodium thiosulfate pentahydrate. At the end of that time the ethanol and water were stripped off under reduced pressure while replacing them with isopropanol. The inorganic salts were then filtered off, and the isopropanol stripped off the filtrate. After drying the residue at a pot temperature of 40–45° C./20 mm., there was obtained 229.5 g. of the viscous, liquid thiosulfate of the formula $$RO(CH_2CH_2O)_{12.2}OCCH_2SSO_3Na$$

in which R is the tridecyl radical derived from "Oxo" process tridecyl alcohol.

*Example 7*

This example compares the wetting-out efficiency of the sodium carbotridecyloxymethyl thiosulfate of Example 1 with the sodium carbo-n-dodecyloxymethyl thiosulfate prepared similarly from n-dodecyl chloroacetate and sodium thiosulfate. Employing the Draves test of the American Association of Textile Chemists, the following wetting speeds were determined:

| Sodium salt tested | Speed of wetting in seconds at percent concentration | | |
|---|---|---|---|
| | 0.5 | 0.25 | 0.031 |
| Carbotridecyloxymethyl thiosulfate (Ex. 1) 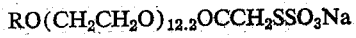 | Inst. | 3.0 | 66.1 |
| Carbo-n-dodecyloxymethyl thiosulfate | 3.3 | 5.7 | 180+ |

The above data shows the wetting speed of the Example 1 tridecyl compound to be surprisingly superior to that of the closely related, homologous dodecyl compound.

*Example 8*

Evaluation of the lathering properties of the sodium carbotridecyloxymethyl thiosulfate of Example 1, the sodium 2-carbotridecyloxyethyl thiosulfate of Example 3, and the tridecyl polyalkyleneoxyalkylene carboxylated thiosulfates $RO(CH_2CH_2O)_nOCCH_2SSO_3Na$ of Examples 4 and 6, respectively, by employing the Ross-Miles lather test of the American Society for Testing Materials gave the following results in water of 300 p.p.m. hardness:

| Carboxylated thiosulfate of— | Lather height, ml. | |
|---|---|---|
| | At once | After 5 minutes |
| Example 1 | 22.2 | 22.2 |
| Example 3 | 19.4 | 19.4 |
| Example 4 | 21.0 | 20.6 |
| Example 6 | 19.6 | 18.2 |

*Example 9*

This example compares the detersive efficiency of the carboxylated thiosulfates of Examples 5 and 6 with that of (A) the sodium carbo-n-dodecyloxymethyl thiosulfate which is obtained by reaction of n-dodecyl chloroacetate with sodium thiosulfate, and (B) the sodium 2-(n-dodecyloxy)ethyl (sulfothio)acetate obtained by the reaction of 2-(n-dodecyloxy)ethyl chloroacetate with sodium thiosulfate. Respective "built" compositions were formulated by incorporating 15 percent by weight of either the carboxylated thiosulfate of Example 1, the carboxylated thiosulfate of Example 2, or (A) or (B) in the same blend of sodium pyrophosphate, sodium tripolyphosphate and soda ash. The resulting "built" compositions were evaluated using the method described by Jay C. Harris and Earl L. Brown, J. Amer. Oil Chemist Soc. 27, 135–143 (1950), wherein the detersive efficiency of a composition is compared to a commercially available product known as "Gardinol" and reputed to be sodium lauryl sulfate. The following results were obtained:

| Built composition containing 15% of— | Detergency, percent of "Gardinol" in water hardness of— | |
|---|---|---|
| | 50 p.p.m. | 300 p.p.m. |
| Example 5 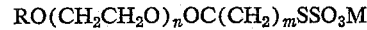 | 121 | 117 |
| Example 6 | 120 | 129 |
| (A) 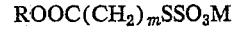 | 66 | 63 |
| (B) | 90 | 90 |

Based on the poor results obtained with (A) and (B) the very high detersive efficiency of the carboxylated thiosulfates of Examples 5 and 6 is most unexpected.

What I claim is:

1. A carboxylated thiosulfate of the formula $$RO(CH_2CH_2O)_nOC(CH_2)_mSSO_3M$$

in which R is the branched chain tridecyl radical derived from a tridecyl alcohol obtained according to the "Oxo" process by the high temperature, high pressure reaction of carbon monoxide and hydrogen with an olefin polymer selected from the class consisting of propylene tetramer and butylene trimer, $n$ is an integer of from 0 to 15, $m$ is an integer of from 1 to 2 and M is selected from the class consisting of alkali metal and ammonium.

2. A carboxylated thiosulfate of the formula $$ROOC(CH_2)_mSSO_3M$$

in which R is the branched chain tridecyl radical derived from a tridecyl alcohol obtained according to the "Oxo" process by the high temperature, high pressure reaction of carbon monoxide and hydrogen with an olefin polymer selected from the class consisting of propylene tetramer and butylene trimer, $m$ is an integer of from 1 to 2 and M is selected from the class consisting of alkali metal and ammonium.

3. An alkali metal carbotridecyloxymethyl thiosulfate wherein the tridecyl radical is derived from a tridecyl alcohol obtained according to the "Oxo" process by the high temperature, high pressure reaction of carbon monoxide and hydrogen with an olefin polymer selected from the class consisting of propylene tetramer and butylene trimer.

4. An alkali metal 2-carbotridecyloxyethyl thiosulfate wherein the tridecyl radical is derived from a tridecyl alcohol obtained according to the "Oxo" process by the high temperature, high pressure reaction of carbon monoxide and hydrogen with an olefin polymer selected from the class consisting of propylene tetramer and butylene trimer.

5. Sodium carbotridecyloxymethyl thiosulfate wherein the tridecyl radical is derived from a tridecyl alcohol obtained according to the "Oxo" process by the high temperature, high pressure reaction of carbon monoxide and hydrogen with an olefin polymer selected from the class consisting of propylene tetramer and butylene trimer.

6. Sodium 2-carbotridecyloxyethyl thiosulfate wherein the tridecyl radical is derived from a tridecyl alcohol obtained according to the "Oxo" process by the high temperature, high pressure reaction of carbon monoxide and hydrogen with an olefin polymer selected from the class consisting of propylene tetramer and butylene trimer.

7. A carboxylated thiosulfate of the formula $$RO(CH_2CH_2O)_xOC(CH_2)_mSSO_3M$$

in which R is the branched chain tridecyl radical derived from a tridecyl alcohol obtained according to the "Oxo" process by the high temperature, high pressure reaction of carbon monoxide and hydrogen with an olefin polymer selected from the class consisting of propylene tetramer and butylene trimer, $x$ is an integer of from 1 to 15, $m$ is an integer of from 1 to 2 and M is selected from the class consisting of alkali metal and ammonium.

8. A carboxylated thiosulfate of the formula $$RO(CH_2CH_2O)_5OCCH_2SSO_3Na$$

in which R is the branched chain tridecyl radical derived from a tridecyl alcohol obtained according to the "Oxo" process by the high temperature, high pressure reaction of carbon monoxide and hydrogen with an olefin polymer selected from the class consisting of propylene tetramer and butylene trimer.

9. A carboxylated thiosulfate of the formula $$RO(CH_2CH_2O)_{7.2}OCCH_2SSO_3Na$$

in which R is the branched chain tridecyl radical derived from a tridecyl alcohol obtained according to the "Oxo" process by the high temperature, high pressure reaction of carbon monoxide and hydrogen with an olefin polymer selected from the class consisting of propylene tetramer and butylene trimer.

10. A carboxylated thiosulfate of the formula $$RO(CH_2CH_2O)_{12.2}OCCH_2SSO_3Na$$

in which R is the branched chain tridecyl radical derived from a tridecyl alcohol obtained according to the "Oxo" process by the high temperature, high pressure reaction of carbon monoxide and hydrogen with an olefin polymer selected from the class consisting of propylene tetramer and butylene trimer.

References Cited in the file of this patent

UNITED STATES PATENTS

| 2,004,873 | Kirstahler | June 11, 1935 |
| 2,609,397 | Gresham | Sept. 2, 1952 |
| 2,818,426 | Kosmin | Dec. 31, 1957 |

FOREIGN PATENTS

| 397,445 | Great Britain | Aug. 24, 1933 |
| 758,756 | France | Jan. 23, 1934 |
| 636,260 | Germany | Oct. 15, 1936 |

UNITED STATES PATENT OFFICE
CERTIFICATE OF CORRECTION

Patent No. 2,904,583            September 15, 1959

Van R. Gaertner

It is hereby certified that error appears in the above numbered patent requiring correction and that the said Letters Patent should read as corrected below.

Column 3, line 51, for (0.33 mole)" read -- (0.3 mole) --; column 4, line 63, for "$RO(CH_2CH_2A)_{7.2}OCCH_2Cl$" read -- $RO(CH_2CH_2O)_{7.2}OCCH_2Cl$ --.

Signed and sealed this 7th day of November 1961.

(SEAL)
Attest:

ERNEST W. SWIDER
Attesting Officer

DAVID L. LADD
Commissioner of Patents

USCOMM-DC